(12) United States Patent
Meng et al.

(10) Patent No.: US 12,241,516 B2
(45) Date of Patent: Mar. 4, 2025

(54) DAMPING SYSTEM FOR HYDRAULIC COUPLING DEVICE, HYDRAULIC COUPLING DEVICE AND MOTOR VEHICLE

(71) Applicant: VALEO KAPEC TORQUE CONVERTERS (NANJING) CO., LTD., Nanjing (CN)

(72) Inventors: Teng Meng, Nanjing (CN); Maohui Li, Nanjing (CN); Lu Li, Nanjing (CN); Shengzhang Wang, Nanjing (CN)

(73) Assignee: VALEO KAPEC TORQUE CONVERTERS (NANJING) CO., LTD., Nanjing (CN)

( * ) Notice: Subject to any disclaimer, the term of this patent is extended or adjusted under 35 U.S.C. 154(b) by 380 days.

(21) Appl. No.: 17/774,793

(22) PCT Filed: Nov. 5, 2020

(86) PCT No.: PCT/CN2020/126703
§ 371 (c)(1),
(2) Date: May 5, 2022

(87) PCT Pub. No.: WO2021/088916
PCT Pub. Date: May 14, 2021

(65) Prior Publication Data
US 2022/0390003 A1 Dec. 8, 2022

(30) Foreign Application Priority Data
Nov. 5, 2019 (CN) .......................... 201911069475.5

(51) Int. Cl.
*F16F 15/14* (2006.01)
*F16H 41/22* (2006.01)
(Continued)

(52) U.S. Cl.
CPC .......... *F16F 15/145* (2013.01); *F16H 41/22* (2013.01); *F16H 41/26* (2013.01); *F16H 45/02* (2013.01); *F16H 57/028* (2013.01); *F16H 2045/0263* (2013.01); *F16H 2045/0278* (2013.01)

(58) Field of Classification Search
CPC ........ F16H 57/028; F16H 41/22; F16H 41/26; F16H 45/02; F16H 2045/0263; F16H 2045/0278; F16F 15/145
See application file for complete search history.

(56) References Cited

U.S. PATENT DOCUMENTS 8,161,740 B2 * 4/2012 Krause .................. F16F 15/145
60/338
9,822,862 B2 11/2017 Depraete
(Continued)

FOREIGN PATENT DOCUMENTS

CN 106687710 A 5/2017
CN 107850177 A 3/2018
(Continued)

OTHER PUBLICATIONS

International Search Report mailed on Jan. 27, 2021 in PCT/CN2020/126703 filed on Nov. 5, 2020.

*Primary Examiner* — Dustin T Nguyen
(74) *Attorney, Agent, or Firm* — Oblon, McClelland, Maier & Neustadt, L.L.P.

(57) ABSTRACT

In a damping system for a hydraulic coupling device includes an output hub having a central axis and an annulus which surrounds the central axis, first tracks are arranged in the annulus, and a plurality of turbine mass assemblies are uniformly distributed around the central axis. Each turbine mass assembly comprises a turbine section carrying a plurality of blades and being provided with a second track corresponding to a respective first track. A roller can roll along a roller track defined by a first track and a correspond- (Continued)

ing second track so that the turbine mass assembly can move relative to the output hub and exert torque on the output hub. Each turbine mass assembly further comprises a mass plate fixedly connected to the turbine section, the output hub being arranged between the mass plate and the turbine section.

20 Claims, 10 Drawing Sheets

(51) Int. Cl.
    *F16H 41/26*     (2006.01)
    *F16H 45/02*     (2006.01)
    *F16H 57/028*     (2012.01)

(56) References Cited

U.S. PATENT DOCUMENTS

| | | | |
|---|---|---|---|
| 9,939,057 | B2 | 4/2018 | Lee et al. |
| 2011/0192692 | A1 | 8/2011 | Werner et al. |
| 2016/0131220 | A1 | 5/2016 | Siemens et al. |
| 2017/0097075 | A1 | 4/2017 | Depraete |
| 2017/0227088 | A1 | 8/2017 | Taikawa et al. |
| 2018/0231098 | A1 | 8/2018 | Güllük et al. |

FOREIGN PATENT DOCUMENTS

| | | | | |
|---|---|---|---|---|
| CN | 108138898 | A | 6/2018 | |
| CN | 108351007 | A | 7/2018 | |
| CN | 109210136 | A | 1/2019 | |
| CN | 211624127 | U | 10/2020 | |
| DE | 102009042837 | A1 | 4/2010 | |
| DE | 102009000068 | * | 7/2010 | ............. F16H 45/02 |
| DE | 102009000068 | A1 | 7/2010 | |
| DE | 102011013480 | B4 | 5/2017 | |
| JP | 9-264399 | A | 10/1997 | |
| JP | 2016-223629 | A | 12/2016 | |
| JP | 2017-166666 | A | 9/2017 | |
| JP | 2018-25298 | A | 2/2018 | |
| WO | WO 2015/151654 | A1 | 10/2015 | |
| WO | WO 2016/103890 | A1 | 6/2016 | |

* cited by examiner

DAMPING SYSTEM FOR HYDRAULIC COUPLING DEVICE, HYDRAULIC COUPLING DEVICE AND MOTOR VEHICLE

TECHNICAL FIELD

The invention relates to a damping system for a hydraulic coupling device, a hydraulic coupling device comprising the damping system and a motor vehicle comprising the hydraulic coupling device.

BACKGROUND

In a transmission system for vehicles, a hydraulic coupling device is arranged between an internal combustion engine and a transmission, and uses fluid as working medium to transmit the torque from the engine to an input shaft of the transmission, thus playing the role of torque transmission, torque conversion and clutch. Generally, the hydraulic coupling device may comprise a damping system for eliminating torque fluctuations inherent in an output of the internal combustion engine.

There is always a need to reduce torsional vibration by improving the structure of hydraulic coupling device.

However, in the prior art, a damping device is mostly a separate device separated from a turbine and other components of the hydraulic coupling device, and in such prior art, the turbine is usually totally fixedly connected with an output hub. On the one hand, this kind of damping device usually has a complicated structure and a large number of components, and the installation of this damping device in the hydraulic coupling device also requires a large number of additional parts and complicated processes. On the other hand, such a damping device usually has large axial extension and thus occupies large axial space of the hydraulic coupling device, which is not conducive to forming a compact hydraulic coupling device.

There is also known a technical solution of using the structure of a turbine housing itself to form a damping device, as described in German patent application DE102009000068. In this technical solution of the prior art, each sub-portion constituting a turbine disk is connected with an output member through a roller and can move relative to the output member, and thus in the case of torque fluctuation, the sub-portions of the turbine disk can be used as pendulous masses to attenuate the torque fluctuation. However, in this kind of technical solution in the prior art, due to the uneven distribution of the pendulous masses on the two sides of the roller along an axial direction, which is particularly obvious during the rotation, unbalanced and unstable movement and even seizure of the roller occur, failing in attenuating the torque fluctuation effectively. In addition, in this kind of technical solution in the prior art, there is no stop member with simple structure, easy realization and integration that can effectively limit the relative displacement stroke between the turbine disk and the output hub.

Therefore, it is desirable to provide a damping system that can use the turbine housing itself to dampen torque fluctuations, while ensuring the smooth movement of the roller and limiting the relative displacement stroke between the turbine disk and the output hub.

SUMMARY OF THE INVENTION

To this end, according to one aspect of the present invention, a damping system for a hydraulic coupling device is proposed, comprising:

an output hub having a central axis and an annulus which surrounds the central axis, a first track being arranged in the annulus, a plurality of turbine mass assemblies uniformly distributed around the central axis, each turbine mass assembly comprising a turbine section, each turbine section carrying a plurality of blades and being provided with a second track corresponding to the first track, a roller that can roll along a roller track defined by the first track and a corresponding second track, so that the turbine mass assembly can move relative to the output hub and exert torque on the output hub, wherein each turbine mass assembly further comprises a mass plate fixedly connected to the turbine section, with the output hub arranged between the mass plate and the turbine section.

That is, in the damping system for the hydraulic coupling device according to the present invention, the turbine mass assembly, comprising the turbine section carrying a plurality of blades, itself constitutes at least a part of the damping system. Specifically, when there is torque fluctuation, under the inertia, the effect of attenuating torque fluctuation is achieved by providing torque opposite to torque fluctuation by rollers rolling along the roller track defined by the first track in the annulus of the output hub and the second track in the corresponding turbine section. That is, the damping system for the hydraulic coupling device according to the present invention not only realizes the damping effect by the turbine section itself, but also simply realizes the stop of the turbine section relative to the output hub by the structure of the component itself, without the need of a separate and complicated damping system which is usually separated from the turbine section in the prior art, thus simplifying the structure of the hydraulic coupling device, greatly reducing the number of components, simplifying the manufacturing and installation processes, and achieving higher cost-effectiveness.

Further, in the damping system for the hydraulic coupling device according to the present invention, the turbine section and the mass plate fixedly connected therewith together form the turbine mass assembly playing the damping role, and the mass plate and the corresponding turbine section which are respectively arranged on the axially opposite sides of the output hub play a role in damping torque fluctuation together with the turbine section, thus achieving improved damping effect. In addition, such a configuration makes it possible to have more uniform pendulous mass distribution on both sides, in the axial direction, of the roller that guides the turbine mass assembly to move relative to the output hub, thereby ensuring a relatively smooth movement of the roller and thus achieving a more effective oscillation damping effect. Moreover, such a configuration is more conducive to the assembly of the turbine section and the mass plate, and a more stable damping system can be realized.

In a more specific embodiment of the damping system for the hydraulic coupling device according to the present invention, the mass plate has the same weight as the turbine section. Therefore, it is possible to ensure a more uniform pendulous mass distribution in the axial direction with respect to the roller, thereby ensuring a more stable movement of the roller and thus ensuring the optimal oscillation damping effect.

Further, the damping system for the hydraulic coupling device according to the present invention further comprises a first stop member arranged on the output hub and a second stop member arranged on the turbine mass assembly, wherein the first stop member and the second stop member can cooperate to limit the displacement stroke of the turbine mass assembly relative to the output hub.

That is, in the damping system for the hydraulic coupling device according to the present invention, the arrangement of the first stop member on the output hub and the second stop member on the turbine mass assembly can limit the displacement stroke of the turbine mass assembly relative to the output hub with a simple and compact structure, thus avoiding the damage (such as break) of the roller in case of torque fluctuation which affects the damping effect or even makes the damping system ineffective.

Optionally, the first stop member is a first notch provided on the output hub, and the second stop member is a first tab provided on the mass plate.

Preferably, the first notch is made integrally with the output hub, while the first tab is made integrally with the mass plate.

Optionally, the first stop member is a first notch provided on the output hub, and the second stop member is a second tab provided on the turbine section.

Preferably, the first notch is made integrally with the output hub, while the second tab is made integrally with the turbine section.

Optionally, the first stop member is a third tab provided on the output hub, and the second stop member is a second notch provided on the turbine section.

Preferably, the third tab is made integrally with the output hub, while the second notch is made integrally with the turbine section.

Optionally, the first stop member is a third tab arranged on the output hub, and the second stop member is a third notch arranged on the mass plate.

Preferably, the third tab is made integrally with the output hub, while the third notch is made integrally with the mass plate.

That is, by arranging the first stop member and the second stop member with simple structures as described above, it can facilitate processing, save materials, and achieve higher cost-effectiveness.

According to one embodiment of the damping system for the hydraulic coupling device of the present invention, the first track is formed by a first roller guide groove provided in the annulus, and the second track is formed by a second roller guide groove provided in the turbine section.

In a more specific implementation according to this embodiment, the mass plate is provided with a third roller guide groove which is the same as the second roller guide groove, and the roller is also axially inserted into the third roller guide groove.

That is, the roller passes through the first roller guide groove, the second roller guide groove and the third roller guide groove at the same time in the axial direction, which is beneficial to the synchronous movement of the turbine section and the mass plate under the condition of torque fluctuation.

In another embodiment of the damping system for the hydraulic coupling device according to the present invention, a fourth roller guide groove is provided in the annulus, and each turbine mass assembly further comprises a track insert which passes through the fourth roller guide groove and which is inserted into the turbine section and the mass plate through its axial ends, respectively, and wherein the first track is formed by the fourth roller guide groove and the second track is formed by the track insert.

That is, in this other embodiment, the track insert is fixed with the turbine section and the mass plate, so that the fixed connection between the turbine section and the mass plate is realized by the track insert, which can further reduce the number of parts of the damping system, simplify the assembly, and facilitate the axial maintenance among the turbine section, the output hub and the mass plate.

In a more specific implementation according to this other embodiment of the present invention, a first concave portion is provided in the turbine section, and a corresponding second concave portion is provided in the mass plate, the axial end portions of the track inserts being inserted into the first concave portion and the second concave portion respectively to form an interference fit. That is, the fixed connection among the turbine section, the track insert and the mass plate can be realized without any additional parts.

According to another aspect of the invention, the invention also relates to a hydraulic coupling device comprising the damping system as described above.

According to another aspect of the present invention, the present invention also relates to a motor vehicle comprising the above-mentioned hydraulic coupling device.

BRIEF DESCRIPTION

In order to explain the technical solutions of the embodiments of the invention more clearly, the drawings of the embodiments of the invention will be briefly introduced below. The drawings are only used to show some embodiments of the present invention, but not to limit all the embodiments of the present invention. In the drawings.

Figure 4:
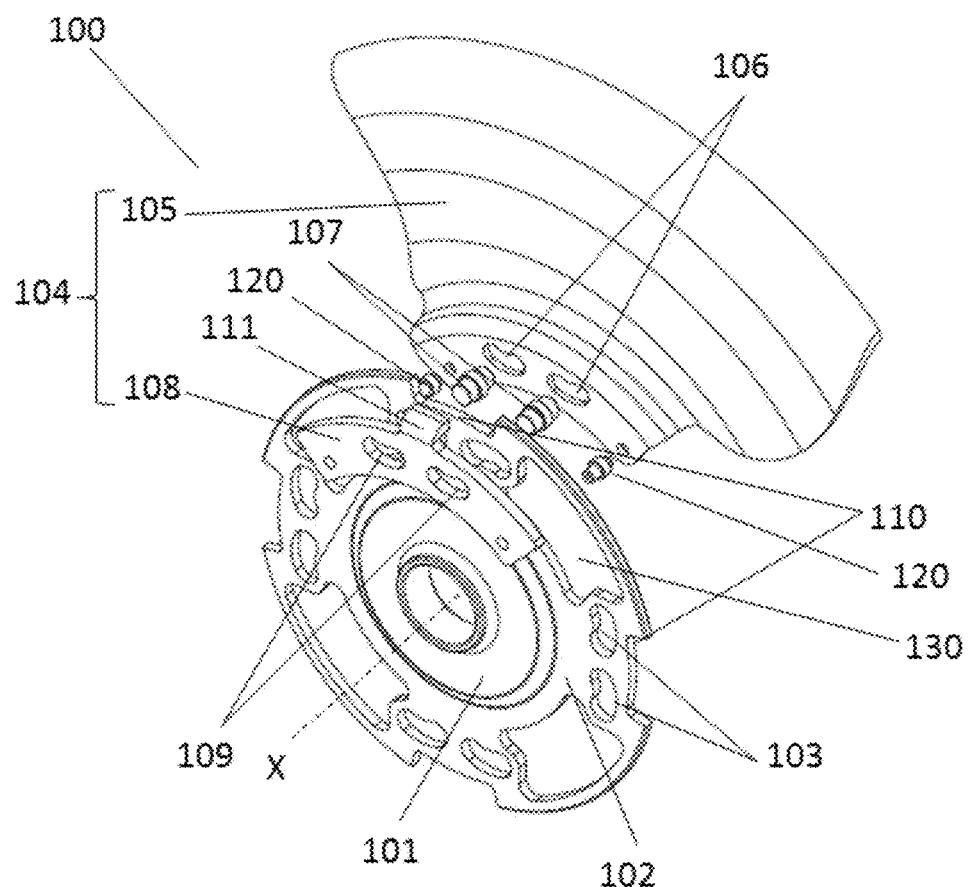
FIG. 4 shows a first embodiment of a damping system for a hydraulic coupling device according to the present invention in a perspective exploded schematic diagram.
Figure 5:
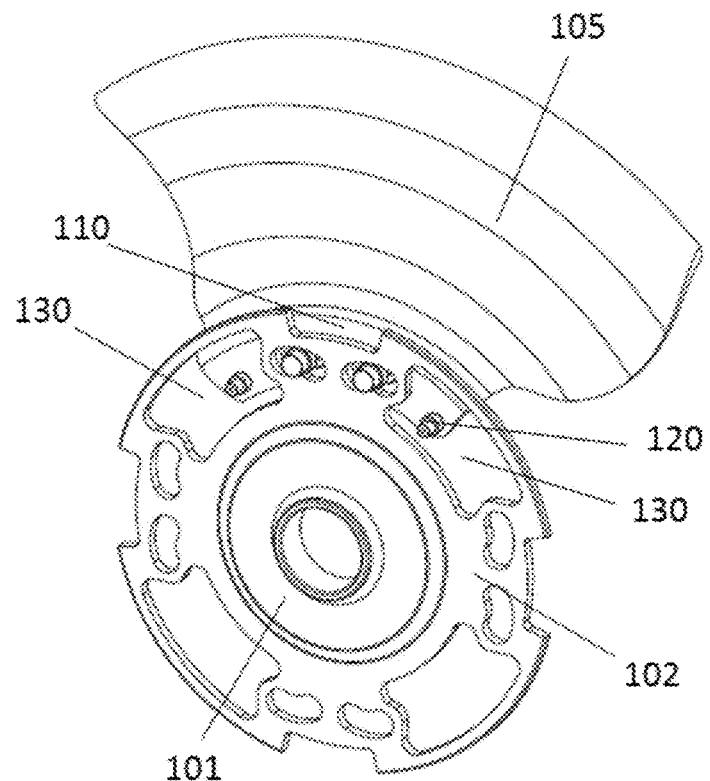
Figure 6:
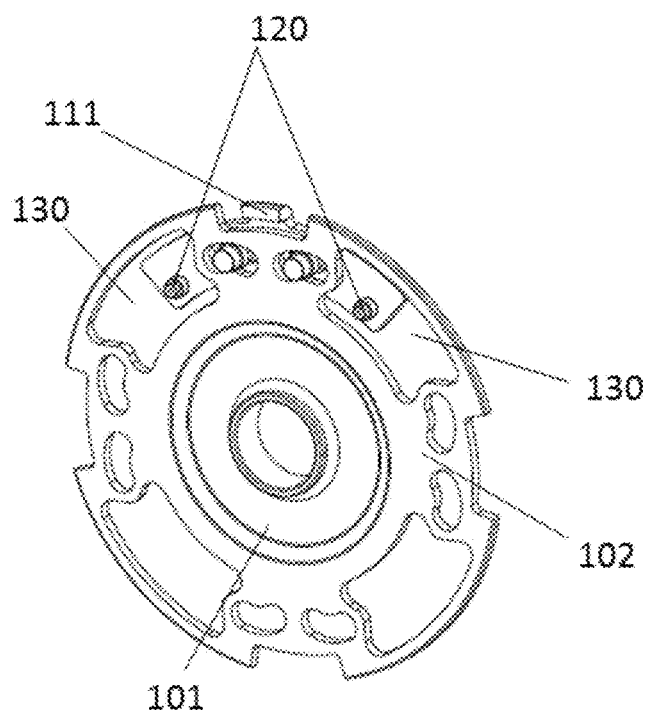
Figure 7:
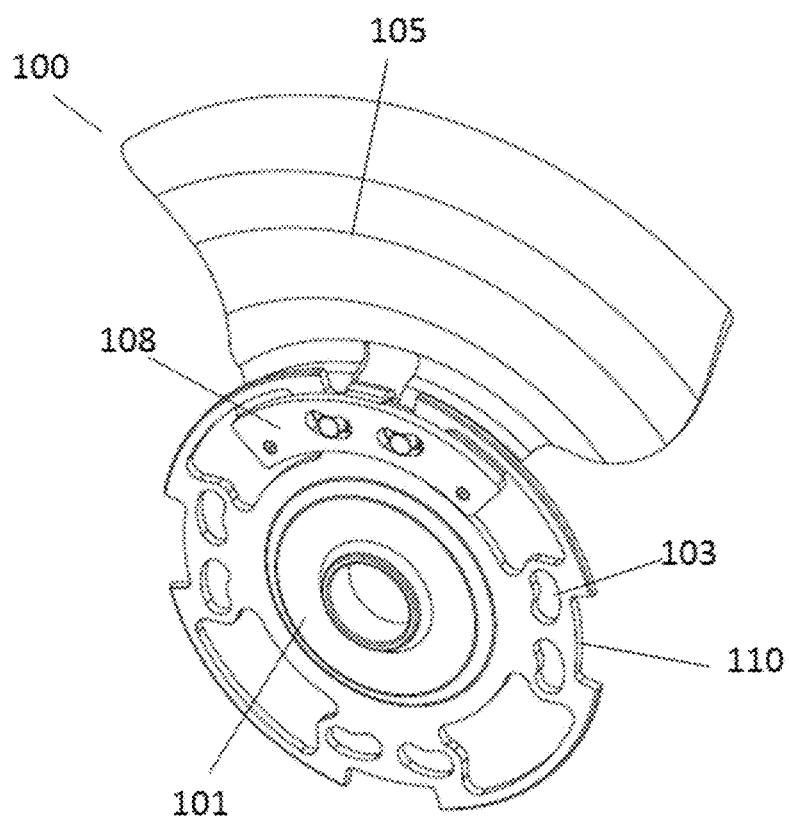
Figure 8:
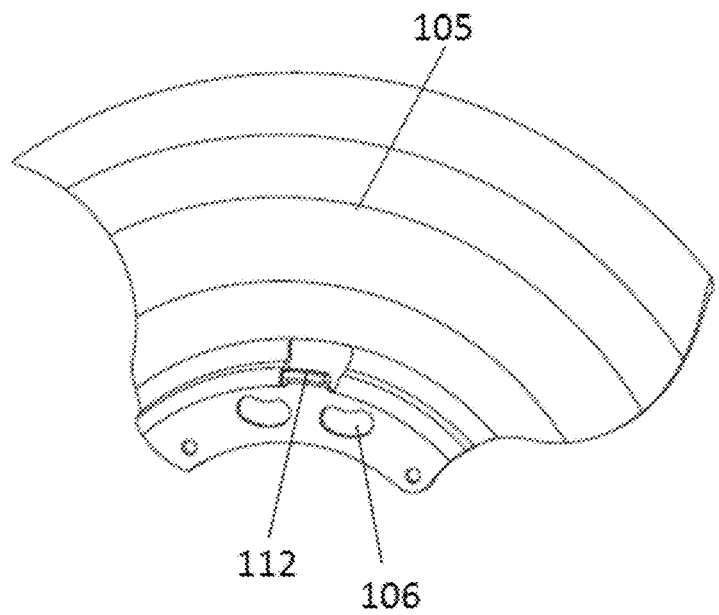
Figure 9:
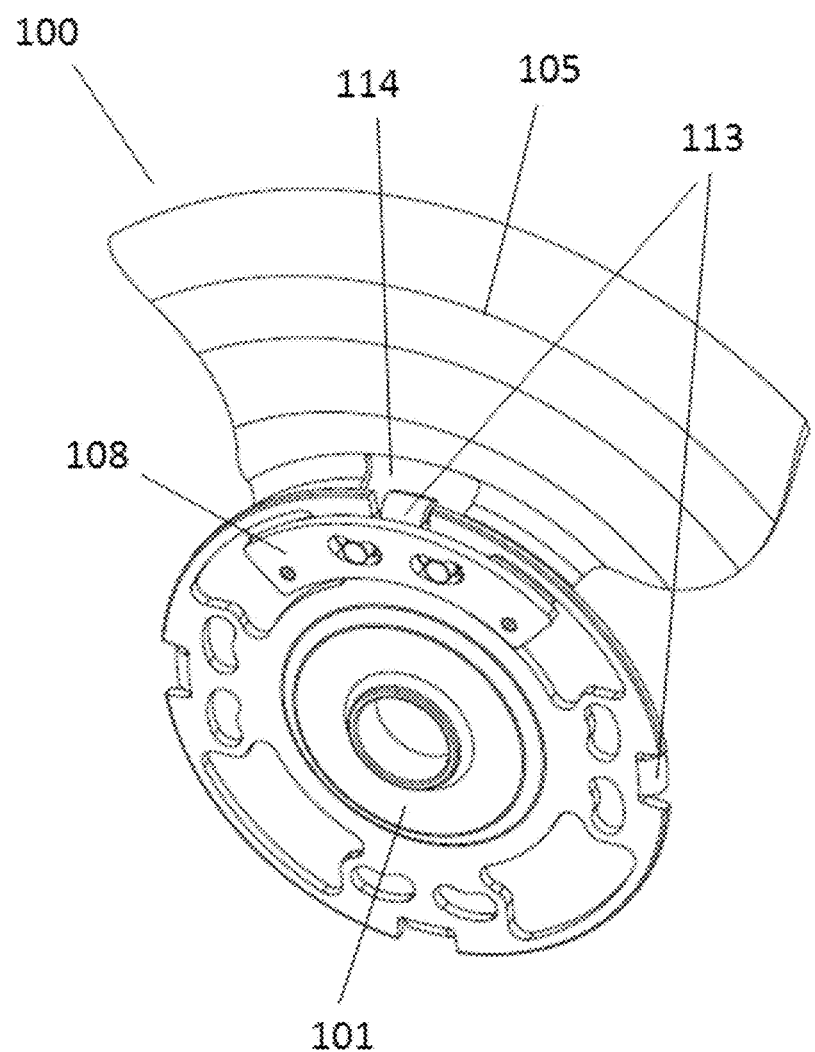
Figure 10:
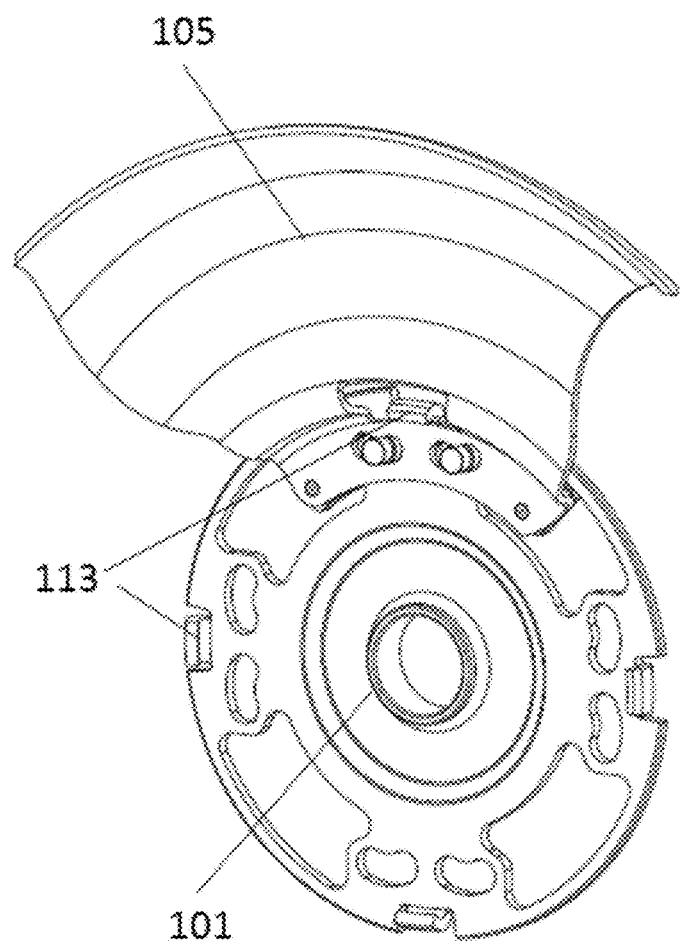
Figure 11:
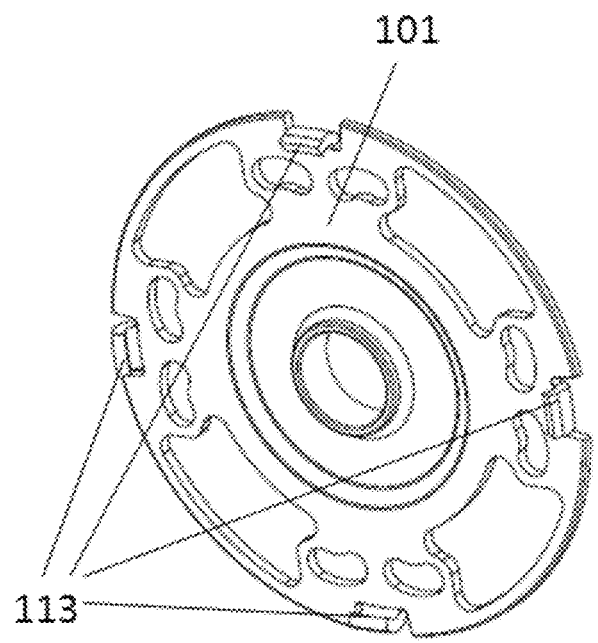
Figure 12:
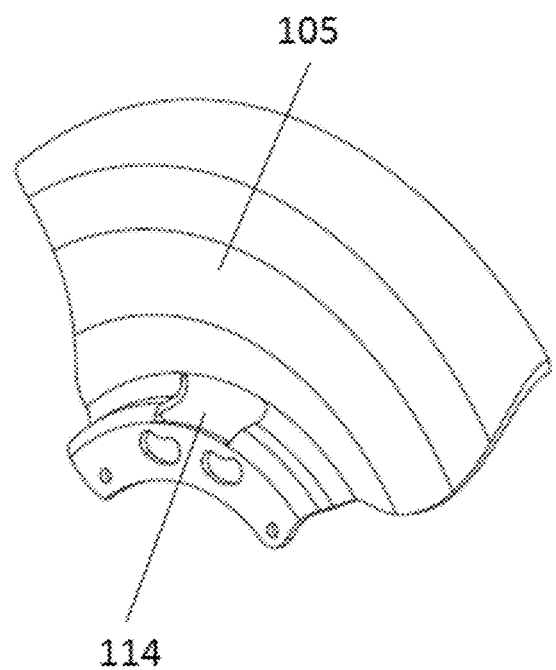
Figure 13:
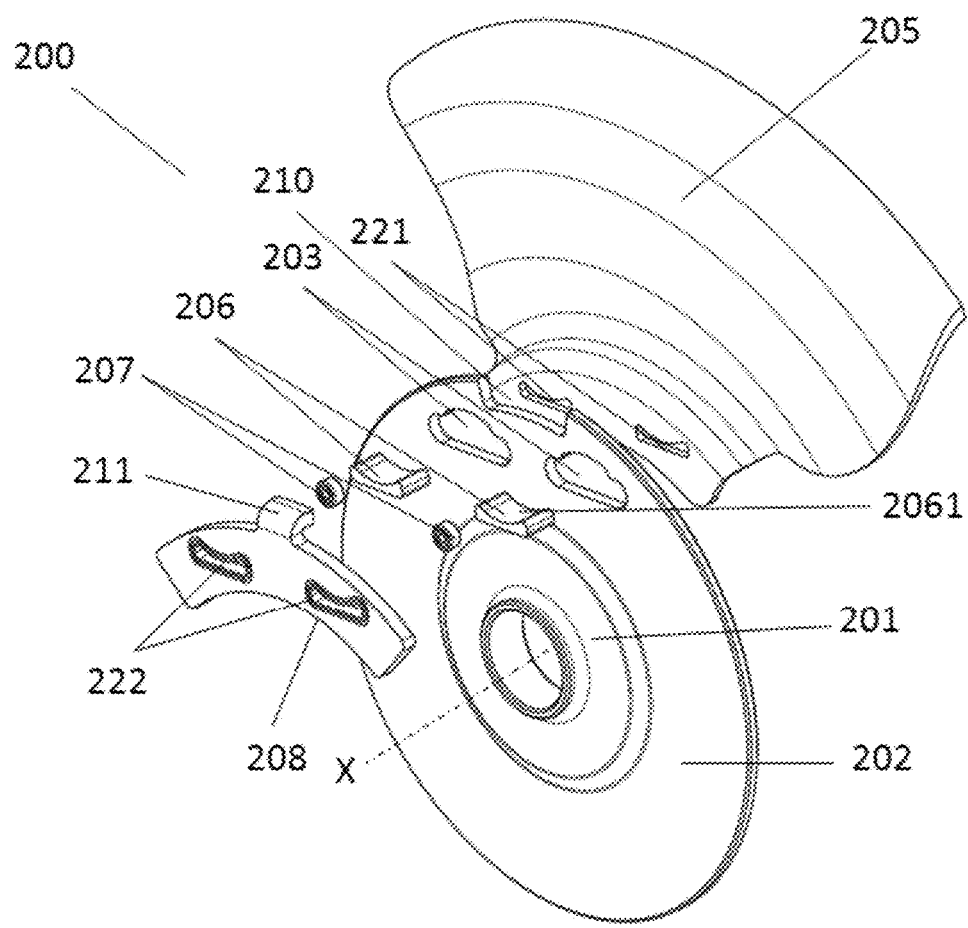
Figure 14:
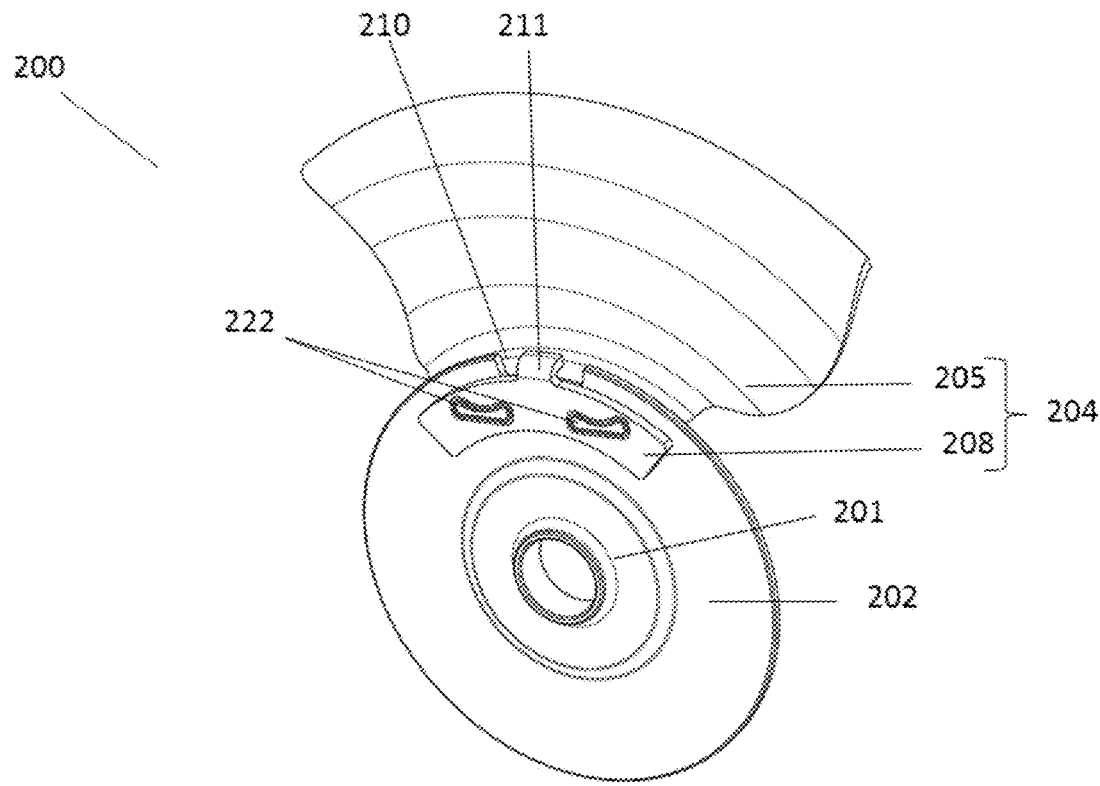
Figure 15:
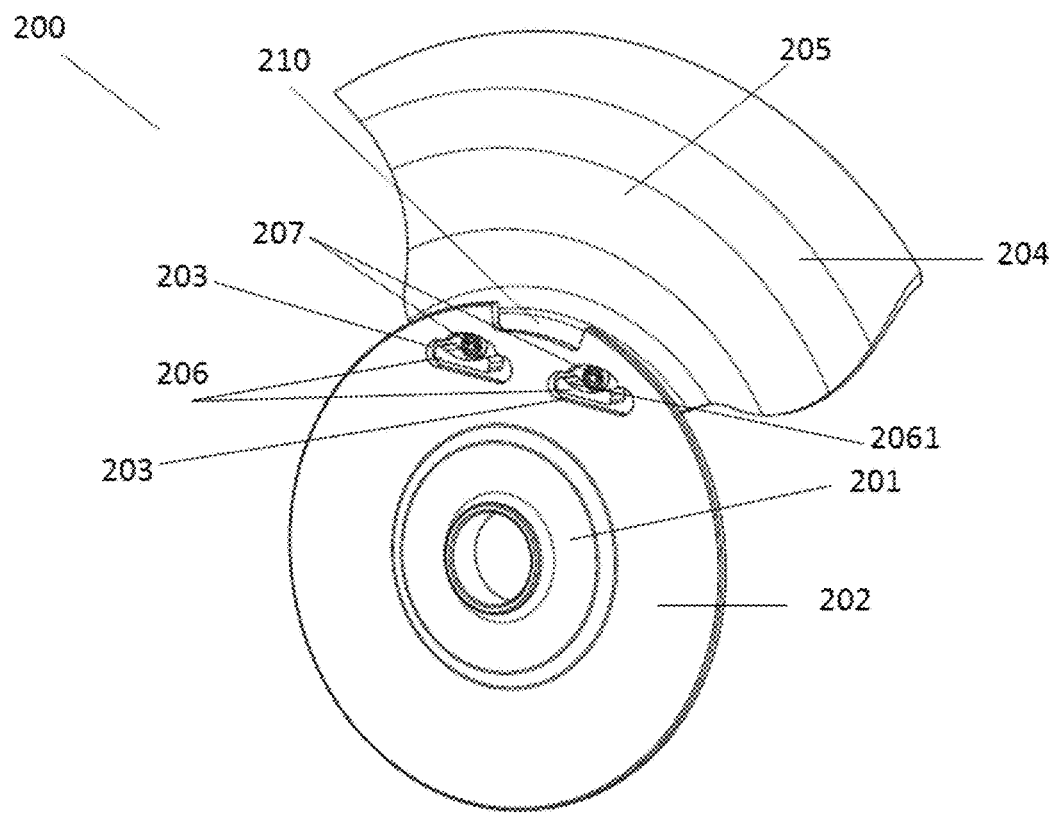

FIG. 5 partially shows the damping system for the hydraulic coupling device shown in FIG. 4 in a schematic perspective view, in which the mass plate is removed;

FIG. 6 partially shows the damping system for the hydraulic coupling device shown in FIG. 4 in another schematic perspective view, with the turbine section removed;

FIG. 7 shows a first variant of the first embodiment of the damping system for the hydraulic coupling device according to the present invention in a perspective schematic diagram;

FIG. 8 shows a turbine section in the variant shown in FIG. 7 in a perspective schematic view;

FIG. 9 shows a second variant of the first embodiment of the damping system for the hydraulic coupling device according to the present invention in a perspective schematic diagram;

FIG. 10 is a perspective view of a second variant shown in FIG. 9 from the turbine section side;

FIG. 11 shows an output hub in the second variant shown in FIG. 9 in a perspective schematic view;

FIG. 12 shows a turbine section in the second variant shown in FIG. 9 in a perspective schematic view;

FIG. 13 shows a second embodiment of a damping system for a hydraulic coupling device according to the present invention in a perspective exploded schematic diagram;

FIG. 14 shows the assembled damping system of the second embodiment shown in FIG. 13 in a schematic perspective view;

FIG. 15 shows the second embodiment shown in FIG. 13 in another perspective schematic view, in which the mass plate is removed.

DETAILED DESCRIPTION OF DISCLOSURE

In order to make the objectives, technical solutions, and advantages of the embodiments of the present disclosure clearer, the technical solutions of the embodiments of the present disclosure will be described clearly and completely in conjunction with the accompanying drawings of the embodiments of the present disclosure. In the drawings, the same reference numerals refer to the same components. Obviously, the described embodiments are part of the embodiments of the present disclosure, rather than all of the embodiments. Based on the described embodiments of the present disclosure, all other embodiments obtained by those of ordinary skill in the art without inventive work are within the protection scope of the present disclosure.

Unless otherwise defined, the technical terms or scientific terms used herein should have the ordinary meaning understood by those with ordinary skills in the field to which this disclosure belongs. The words "first", "second" and similar words used in the present disclosure do not indicate any order, quantity, or importance, but are only used to distinguish different components. Similarly, similar words such as "one" or "the" do not necessarily mean quantitative restriction. Words "comprise" or "comprise" and other similar words mean that the elements or objects appearing in front of the word cover the elements or objects listed after the word and their equivalents, without excluding other elements or objects. Words like "connected" or "coupled" are not limited to physical or mechanical connections, but can comprise electrical connections, whether direct or indirect. The directional terms such as "upper", "lower", "left", "right", "top", "bottom", "clockwise", "counterclockwise" mentioned in the text are only used to describe relative position relationships with respect to the drawings, and when the absolute position of a described object changes, the relative position relationship may also change accordingly.

In the sense of the present invention, "axial direction" means the direction along the central axis X of an output hub of a damping system for a hydraulic coupling device, "radial direction" means the direction orthogonal to and intersecting with this central axis X, "radially outer side" means the position far from the central axis X in the radial direction, "radially inner side" means the position close to the central axis X in the radial direction, and "circumferentially" means around the central axis X.

Figure 1:
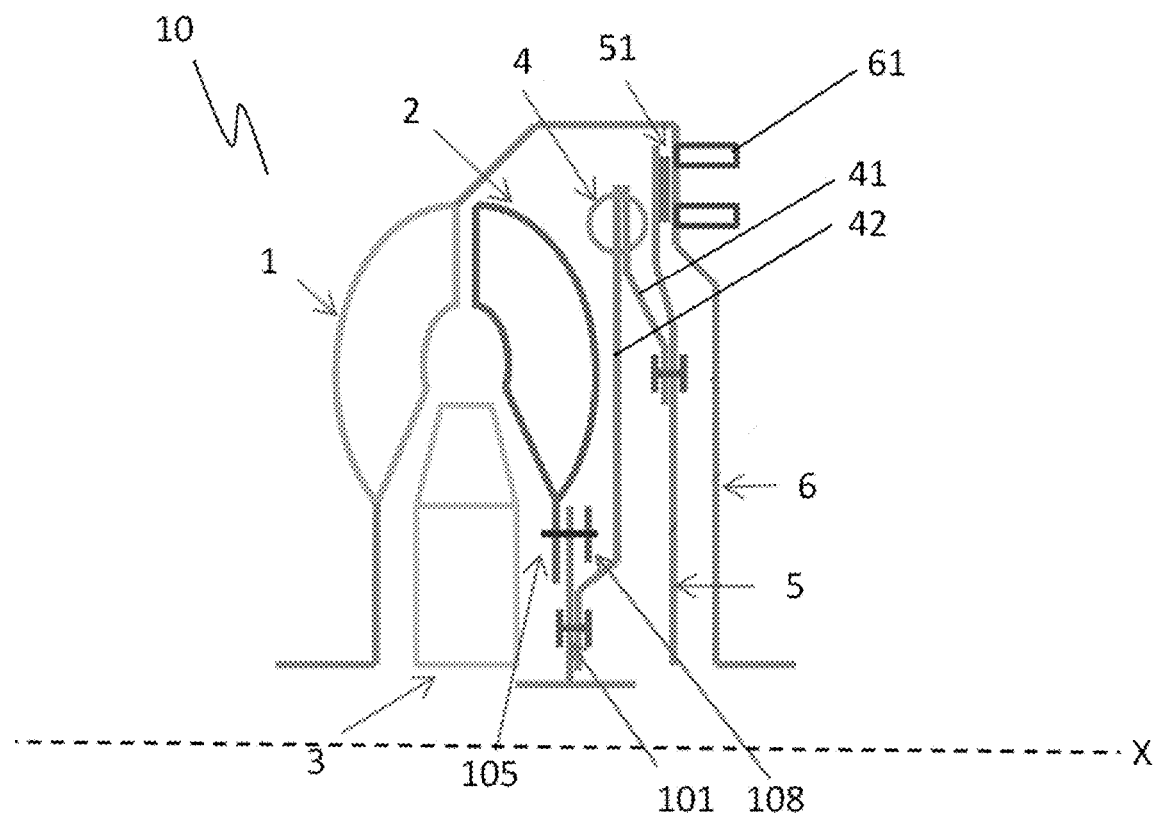
FIG. 1 is a schematic cross-sectional view of a hydraulic coupling device according to the present invention.

FIG. 1 is a schematic cross-sectional view of a hydraulic coupling device 10 with a central axis x according to the present disclosure to illustrate a structure of the hydraulic coupling device. The hydraulic coupling device 10 can be used in motor vehicles. The cross-section shown in FIG. 1 is a cross-section taken along the central axis X, that is, the central axis X is located in the cross-section, and FIG. 1 shows in the cross-section only a portion of the hydraulic coupling device 10 that is located on one side of the central axis X.

Figure 2:
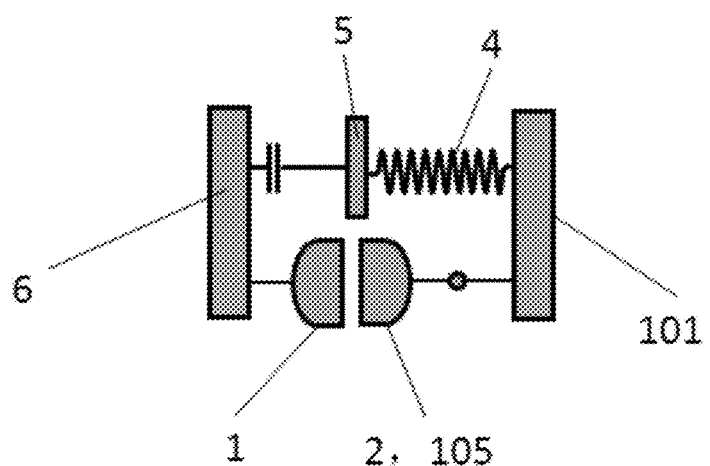
FIG. 2 is a schematic diagram of a hydraulic coupling device according to the present invention.

FIG. 2 is a schematic diagram of a hydraulic coupling device 10 according to the present disclosure to schematically illustrate a torque transmission path.

As shown in FIG. 1 and referring to FIG. 2, the hydraulic coupling device 10 comprises a casing 6, which receives torque from an engine, for example, through a lug 61 fixedly arranged at a radially outer side thereof, so that the casing 6 can rotate around a central axis X. The hydraulic coupling device 10 may further comprise a pump impeller 1, a turbine 2, and a stator 3 disposed between the pump impeller 1 and the turbine 2 in the direction of the central axis X. The pump impeller 1 may be fixedly connected with the casing 6, for example, by welding, so that when the casing 6 rotates, the pump impeller 1 rotates with it.

The hydraulic coupling device 10 may further comprise a spring damper 4 and a lock-up clutch 5 arranged between the turbine 2 and the casing 6 in the direction of the central axis X. The lock-up clutch 5 can be engaged with and disengaged from the casing 6 in the direction of the central axis X. For example, the lock-up clutch 5 can be engaged with the casing 6 through its radially outer portion 51 facing the casing 6, thereby receiving torque from the casing 6. A driving disk 41 of the spring damper 4 can be fixedly connected with the lock-up clutch 5, while its output disk 42 can be fixed to an output hub 101. The output hub 101 can be mounted to the turbine 2, which will be described in detail in the following embodiments.

When the lock-up clutch 5 is separated from the casing 6, there is no torque transmission between the casing 6 and the spring damper 4, and the rotation of the casing 6 drives the pump impeller 1 fixedly connected therewith to rotate, and the pump impeller 1 then drives the turbine 2 to rotate through fluid, and then the torque is transmitted to an input shaft of a transmission t (not shown) via the output hub 101 mounted to the turbine impeller 2. This is advantageous in the start of a vehicle, and can effectively increase the torque.

When the lock-up clutch 5 is engaged with the casing 6, the torque from the engine is transmitted to the input shaft of the transmission through the casing 6, the lock-up clutch 5, the spring damper 4 and the output hub 101 in sequence. In this case, the torque fluctuation of the internal combustion engine will be transmitted to the downstream transmission; although the spring damper 4 can partially absorb this torque fluctuation, there are still some problems in vibration, noise and fuel consumption.

Therefore, the present invention proposes a new damping system for hydraulic coupling devices.

Figure 3:
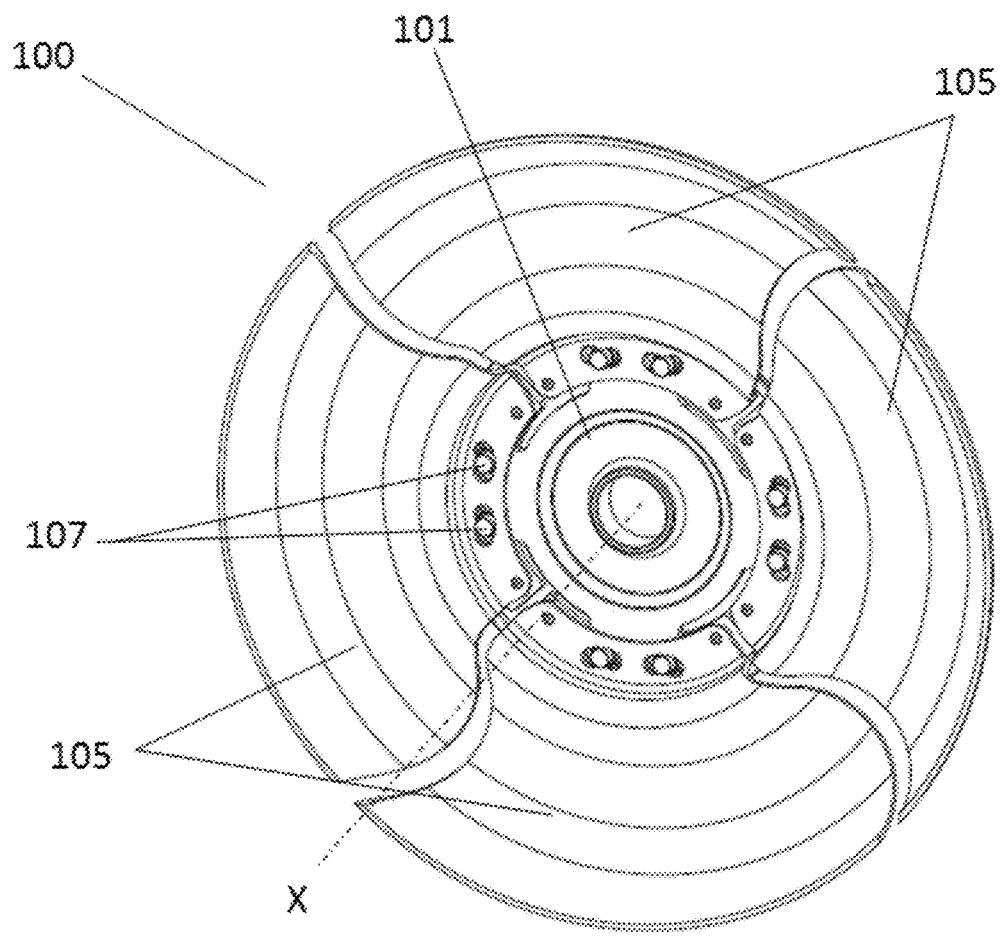
FIG. 3 is a perspective view of a first embodiment of a damping system for a hydraulic coupling device according to the present invention, as viewed from the turbine section side.

FIG. 3 is a perspective view of the first embodiment of the damping system according to the present disclosure from the inside of the turbine. Specifically, as shown in FIG. 3, the turbine 2 comprises a plurality of turbine sections 105 which are generally in the form of a sector and distributed in the circumferential direction, and each turbine section 105 is mounted to the output hub 101 and can generate relative displacement in the circumferential and radial directions relative to the output hub 101. That is, when the torque is transmitted through the lock-up clutch 5 and the spring damping system, the turbine section itself constitutes a part of the damping system for the hydraulic coupling device. Therefore, when the lock-up clutch 5 is engaged, vibrations can be reduced further with the turbine section itself on the basis of vibration reduction through the spring damper 4, which makes it possible to further attenuate torque fluctuation, reduce noise and improve comfort of the whole vehicle.

The damping system 100 according to the first embodiment of the present disclosure is described in detail below with reference to FIGS. 3-12.

As shown in FIGS. 4-6, the damping system 100 may comprise an output hub 101, which also has the above-mentioned central axis X, and an annulus 102 around the central axis X.

The damping system 100 may comprise a plurality of turbine mass assemblies 104 evenly distributed around that central axis X. In this embodiment, each turbine mass assembly 104 comprises a turbine section 105. For clarity, only one of the turbine sections 105 is shown in FIGS. 4-5. Each turbine section 105 may carry a plurality of blades (not shown).

The damping system 100 may further comprise rollers 107, two of which are shown in FIGS. 4-6, and they have a generally cylindrical shape. The roller 107 can roll along a roller track, so that the turbine mass assembly 104 can move relative to the output hub 101 and exert torque on the output hub 101. Specifically, a first track may be provided in the annulus 102 of the output hub 101, as shown in FIGS. 4-6. For example, the first track may be formed by a first roller guide groove 103. Two first roller guide grooves 103 are shown. The turbine section 105 may be provided with a second track corresponding to the first track. For example, the second track may be formed by a second roller guide groove 106 corresponding to the first roller guide groove 103 and provided on the annular part of the turbine section 105 close to the central axis X. The roller track is defined by the first track and the second track.

In a more specific embodiment, as shown in the figures, the first roller guide groove 103 and the second roller guide groove 106 may be provided in the form of a waist-shaped hole, which may have an elongated shape, for example. The convex direction of the waist-shaped hole forming the first roller guide groove 103 is diametrically opposite to the convex direction of the waist-shaped hole forming the second roller guide groove 106, for example, as shown in the figures, the waist-shaped hole forming the first roller guide groove 103 bulges radially outward, while the waist-shaped hole forming the second roller guide groove 106 bulges radially inward. The roller 107 is axially inserted into the waist-shaped hole forming the first roller guide groove 103 and the waist-shaped hole forming the second roller guide groove 106

The form and arrangement of the first roller guide groove 103 and the second roller guide groove 106 are described here by way of example only. Other forms are also possible and within the scope of protection of the present invention, for example, they can be provided in the form of a corrugated hole.

Referring to FIGS. 4-6, in the damping system 100 according to the first embodiment of the present disclosure, each turbine mass assembly 104 may further comprise a mass plate 108, which is fixedly connected with the turbine section 105, for example, by two rivets 120, and the output hub 101 is axially arranged between the mass plate 108 and the turbine section 105. This arrangement enables to have a relatively uniform pendulous mass distribution in the axial direction for the roller 107 that guides the turbine mass assembly 104 to move relative to the output hub 101, thereby ensuring a relatively stable movement of the roller 107 and thus ensuring a more effective oscillation damping effect. Further, the mass plate 108 may have a generally annular sector shape, as shown in the figures. The mass plate 108 and the annular portion of the turbine section 105 close to the central axis X are respectively located on both sides of the annulus 102 of the output hub. As also shown in FIGS. 4-6, the annulus 102 of the output hub 101 is provided with one or more windows 130, and two windows 130 are shown in the figures, which are used for fasteners (rivets 120) that fixedly connect the mass plate 108 with the turbine section 105 to pass through, so that when the turbine mass assembly 104, as a whole, moves relative to the output hub 101, the fasteners (rivets 120) will not interfere with the relative movement.

The mass plate 108 may have the same weight as the corresponding turbine section 105. Therefore, the mass plate 108 and the corresponding turbine section 105 provide a uniform mass distribution on both sides of the roller in the axial direction, realizing the balanced and stable movement of the roller. Further, the mass plate 108 may be further provided with a third roller guide groove 109 which is the same as the second roller guide groove 106 on the turbine section 105, and then the roller 107 may also be axially inserted into the third roller guide groove 109. That is, the roller 107 passes through the first roller guide groove 103, the second roller guide groove 106 and the third roller guide groove 109 at the same time in the axial direction. This arrangement facilitates the synchronous movement of the turbine section 105 and the mass block 108.

In a more specific embodiment, a first stop member is provided on the output hub 101, and a second stop member is provided on the turbine mass assembly 104. The first stop member and the second stop member can cooperate to limit the displacement stroke of the turbine mass assembly 104 relative to the output hub 101.

In this first embodiment, the first stop member is a first notch 110 provided on the output hub 101. The first notch 110 may be a circumferential notch provided at a radially outer portion of the output hub 101 and open radially outward. A second stop member may be provided on the turbine mass assembly 104. Specifically, the second stop member is a first tab 111 provided on the mass plate 108. The first tab 111 may be integrally formed with the mass plate 108. The first tab 111 may protrude from the radial outer edge of the mass plate 108 toward the first notch 110 on the output hub 101, for example, axially protruding into the first notch 110. Therefore, a circumferential edge of the first tab 111 can form stop cooperation with a circumferential edge of the first notch 110 to limit the displacement stroke of the turbine mass assembly 104 relative to the output hub 101. This displacement stroke is smaller than the stroke of the roller 107 in the roller track.

In addition, regardless of whether the turbine mass assembly 104 moves radially or circumferentially relative to the output hub 101, the first tab 111 can protrude into the first notch 110.

In the damping system 100 for a hydraulic coupling device according to the present disclosure, the turbine 2 is divided into a plurality of turbine sections 105, for example, three to six turbine sections 105, preferably four turbine sections 105, which are generally sector-shaped. When the torque is transmitted through the path with the lock-up clutch, the turbine section 105 itself constitutes a component of the damping system 100 attenuating the torque fluctuation. Specifically, when there is torque fluctuation, under the inertia, the roller 107 rolling along the roller track defined by the first track provided by the output hub 101 and the second track provided by the turbine mass assembly 104 provides torque opposite to the torque fluctuation, thereby achieving the effect of attenuating the torque fluctuation. And the first stop part provided by the output hub is matched with the second stop part provided by the turbine mass assembly, so that the relative displacement stroke between them is limited. Therefore, when the first stop member and the second stop member cooperate with each other to realize stopping function, torque transmission is realized, and the roller is prevented from being subjected to strong impact due to collision with the two ends of the rolling track, which strong impact may cause the roller to be damaged, for example, broken, thereby affecting the attenuation effect or making the damping system ineffective.

Meanwhile, in the damping system for the hydraulic coupling device according to the present disclosure, the arrangement of the first stop member on the output hub 101 and the second stop member on the turbine mass assembly 104 are both realized by using theirs own structures, and the manufacturing is simple, ingenious and compact, thereby reducing the number of components and the manufacturing cost.

Furthermore, in this embodiment, the mass plate 108 is not only fixedly connected with the turbine section 105, but also plays a role in damping torque fluctuation together with the turbine section 105, thus achieving a better damping effect.

Therefore, in the damping system for the hydraulic coupling device according to the present invention, the first stop member and the second stop member with simple structure, convenient processing and material saving can be realized, and thus higher cost efficiency can be achieved, while effective operation of the damping system can be ensured.

A variant of the damping system according to the first embodiment will be described below with reference to FIGS. 7-12.

FIGS. 7 and 8 show a first variant of the damping system 100 according to the first embodiment of the present disclosure. Specifically, FIG. 7 is a schematic perspective view of the damping system according to the first variant after assembly, and FIG. 8 only shows the perspective view of the turbine section to clearly show the second stop member.

Specifically, as shown in FIGS. 7-8, the first stop member may still be a first notch 110 provided on the output hub 101, while the second stop member is a second tab 112 provided on the turbine section 105. The second tab 112 protrudes into the first notch 110. Preferably, the second tab 112 can be integrally formed with the turbine section 105, for example, by stamping.

FIGS. 9-12 show a second variant of the damping system 100 of the first embodiment of the present disclosure. FIGS. 9 and 10 show the assembled damping system 100 according to this second variant, which are perspective views from the side of the mass plate 108 and the side of the turbine section 105, respectively. FIG. 11 only schematically shows a perspective view of the output hub 101 in this second variant, so as to clearly show the stop member on the output hub side. FIG. 12 only schematically shows one of the turbine sections 105 in this second variant, so as to clearly show the stop member on the turbine section side that cooperates with the stop member on the output hub side.

As shown in FIGS. 9-12, the difference between this second variant and the first variant lies in the arrangement of the first stop member and the second stop member that cooperate with each other. In this second embodiment, the first stop member is a third tab 113 provided on the output hub 101, and the second stop member is a second notch 114 provided on the turbine section 105.

The third tab 113 may be disposed radially outside the annulus 102 of the output hub 101 and protrude into the second notch 114 of the turbine section 105. The third tab 113 can be formed by bending a part of the radially outer portion of the annulus 102 in the direction of the turbine section 105, thereby utilizing the material of the output hub 101 itself. The second notch 114 can be formed by cutting out a portion of the turbine section 105, thereby also utilizing the turbine section itself. Therefore, the relative displacement stroke between the two is realized without adding new parts. And both the output hub 101 and the turbine section 105 can be integrally formed by stamping, without an additional operation of manufacturing a stop member.

In the third variant (not shown) according to the first embodiment of the present invention, the first stopper is still a third tab 113 provided on the output hub 101, while the second stopper is a third notch (not shown) provided on the mass plate 108, and the third tab 113 protrudes into the third notch.

Referring to FIGS. 13-15, a damping system 200 for a hydraulic coupling device according to a second embodiment of the present disclosure will be described below. The main differences between the damping system 200 and the first embodiment lie in the connection mode between the turbine section and the mass plate and the way of forming the roller track are different. These differences will be highlighted below.

With reference to FIG. 13, which is an exploded perspective view of the damping system 200. FIG. 14 is a schematic perspective view of the damping system 200 after being assembled. FIG. 15 is a schematic perspective view of the damping system 200 with the mass plate 208 removed to clearly show the formation of the roller track.

In the damping system 200 according to this second embodiment, a fourth roller guide groove 203 may be provided in the annulus 202 of the output hub 101. As shown in FIG. 13, a radially outer portion of the fourth roller guide groove 203 may have a radially outward curved shape, and a radially inner portion thereof may have a straight shape.

Each turbine mass assembly 204 may further comprise a mass plate 208, the output hub 201 being axially disposed between the turbine section 205 and the mass plate 208. The turbine mass assembly 204 also comprises a track insert 206 that passes through the fourth roller guide groove 203. The track insert 206 may be boat-shaped and may have a concave surface 2061 facing radially outward, forming a second track, and forming a roller track together with a first track formed by a radially outer portion of the fourth roller guide groove 203 provided in the annulus 202 of the output hub 201.

Further, the turbine section 205 is provided with a first recess 221, and the mass plate 208 is provided with a corresponding second recess 222. The track insert 206 is inserted into the first recess 221 and the second recess 222 through its axial ends, respectively, and forms an interference fit therewith.

Thus, the first track is formed by the fourth roller guide groove 203, and the second track is formed by the track insert 206, which together define the roller track. The roller 207 can move on such a roller track, and when torque fluctuation occurs, the roller 207 rolling along the roller track provides a torque opposite to the torque fluctuation, thereby achieving the effect of damping the torque fluctuation.

In addition, in this second embodiment, the track insert 206 is fixed with the corresponding turbine section 205 and mass plate 208 by interference fit, without the need of any other fixing member, which can further reduce the number of components of the damping system and simplify the assembly.

Further, in this second embodiment, the first stop member is a first notch 210 provided on the output hub 201, and the second stop member is a first tab 211 provided on the mass plate 208 and protruding into the first notch 210. The first tab 211 may be integrally formed with the mass plate 208, for example, by stamping.

The second embodiment can also have different variants. Specifically, the arrangement of the first stopper member and the second stopper member in the first to third variants according to the first embodiment can be applied to the second embodiment shown in FIGS. 13 to 15.

Specifically, in the first variant (not shown) of the second embodiment, the first stop member may be a first notch provided on the output hub 201, and the second stop member may be a second tab provided on the turbine section 205.

In the second variation (not shown) of the second embodiment, the first stop member is a third tab provided on the output hub 201, and the second stop member is a second notch provided on the turbine section 205.

In the third variation (not shown) of the second embodiment, the first stopper is a third tab provided on the output hub 201, and the second stopper is a third notch provided on the mass plate 208.

The exemplary implementations of the damping system for the hydraulic coupling device proposed by the present invention has been described in detail above with reference to the preferred embodiments, but it is understood by those skilled in the art that without departing from the concept of the present invention, various modifications and variations can be made to the above specific implementations, and various technical features and structures proposed by the present invention can be combined in various ways without exceeding the protection scope of the present invention.

The invention claimed is:

1. A damping system for a hydraulic coupling device, comprising:
   an output hub having a central axis and an annulus around the central axis, a plurality of first tracks being arranged in the annulus,
   a plurality of turbine mass assemblies uniformly distributed around the central axis, each turbine mass assembly comprising a turbine section, each turbine section carrying a plurality of blades and being provided with a second track corresponding to one of the first tracks,
   a roller that can roll along a roller track defined by one of said first tracks and its corresponding second track, so that the turbine mass assembly can move relative to the output hub and exert torque on the output hub,
   wherein each of said turbine mass assemblies further comprises a mass plate fixedly connected to a respective turbine section, the output hub being arranged between the respective mass plate and turbine section.

2. The damping system for a hydraulic coupling device according to claim 1, wherein the mass plate has the same weight as its respective turbine section.

3. The damping system for a hydraulic coupling device according to claim 2, wherein each of the first tracks is formed by a first roller guide groove provided in the annulus, and each of the second tracks is formed by a second roller guide groove provided in a respective one of the turbine sections.

4. The damping system for a hydraulic coupling device according to claim 2, wherein:
   a fourth roller guide groove is provided in the annulus,
   each of the turbine mass assemblies further comprises a track insert which passes through the fourth roller guide groove and is inserted into the respective turbine section and the respective mass plate through its respective axial ends, and
   wherein the first track is formed by the fourth roller guide groove, while the second track is formed by the track insert.

5. A hydraulic coupling device comprising the damping system according to claim 2.

6. The damping system for a hydraulic coupling device according to claim 1, further comprising:
   a first stop member provided on the output hub; and
   a second stop member provided on at least one of said turbine mass assemblies,
   wherein the first stop member and the second stop member can cooperate to limit the displacement stroke of the at least one of said turbine mass assemblies relative to the output hub.

7. The damping system for a hydraulic coupling device according to claim 6, wherein the first stop member is a first notch provided on the output hub, and the second stop member is a first tab provided on the mass plate of the at least one of said turbine mass assemblies.

8. The damping system for a hydraulic coupling device according to claim 7, wherein the first track is formed by a first roller guide groove provided in the annulus, and each of the second tracks is formed by a second roller guide groove provided in a respective one of the turbine sections.

9. The damping system for a hydraulic coupling device according to claim 6, wherein the first stop member is a first notch provided on the output hub, and the second stop member is a second tab provided on the turbine section of the at least one of said turbine mass assemblies.

10. The damping system for a hydraulic coupling device according to claim 6, wherein the first stop member is a third tab arranged on the output hub, and the second stop member is a second notch arranged on the turbine section of the at least one of said turbine mass assemblies.

11. The damping system for a hydraulic coupling device according to claim 6, wherein the first stop member is a third tab arranged on the output hub, and the second stop member is a third notch arranged on the mass plate of the at least one of said turbine mass assemblies.

12. The damping system for a hydraulic coupling device according to claim 6, wherein the first track is formed by a first roller guide groove provided in the annulus, and the second track is formed by a second roller guide groove provided in a respective one of the turbine sections.

13. The damping system for a hydraulic coupling device according to claim 6, wherein:
   a fourth roller guide groove is provided in the annulus,
   each of the turbine mass assemblies further comprises a track insert which passes through the fourth roller guide groove and is inserted into the respective turbine section and the mass plate through its respective axial ends, and
   wherein the first track is formed by the fourth roller guide groove, while the second track is formed by the track insert.

14. A hydraulic coupling device comprising the damping system according to claim 6.

15. The damping system for a hydraulic coupling device according to claim 1, wherein the first tracks are each formed by a first roller guide groove provided in the annulus, and the second tracks are each formed by a second roller guide groove provided in a respective one of the turbine sections.

16. The damping system for a hydraulic coupling device according to claim 15, wherein the mass plate of each of the turbine mass assemblies is provided with a third roller guide groove which is the same as the respective second roller guide groove of said turbine mass assembly, each respective roller being also axially inserted into the third roller guide groove.

17. The damping system for a hydraulic coupling device according to claim 1, wherein:
- a fourth roller guide groove is provided in the annulus,
- each of said turbine mass assemblies further comprises a track insert which passes through the respective fourth roller guide groove and is inserted into the respective turbine section and the respective mass plate through its respective axial ends, and
- wherein each respective first track is formed by the fourth roller guide groove, while each respective second track is formed by the track insert.

18. The damping system for a hydraulic coupling device according to claim 17, wherein a first recess is provided in each of said turbine sections, and a corresponding second recess is provided in the mass plate of the respective turbine mass assembly, the axial ends of the corresponding track insert being respectively inserted into the first recess and the second recess to form an interference fit.

19. A hydraulic coupling device comprising the damping system according to claim 1.

20. A motor vehicle comprising the hydraulic coupling device according to claim 19.

\* \* \* \* \*